United States Patent
Lin et al.

(10) Patent No.: US 11,557,975 B2
(45) Date of Patent: Jan. 17, 2023

(54) POWER SUPPLIES WITH SYNCHRONOUS RECTIFICATION

(71) Applicant: Leadtrend Technology Corporation, Zhubei (TW)

(72) Inventors: Chung-Wei Lin, Zhubei (TW); Hung Ching Lee, Zhubei (TW); Tsung Chien Wu, Zhubei (TW); Bo-Yi Wu, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 115 days.

(21) Appl. No.: 17/012,242

(22) Filed: Sep. 4, 2020

(65) Prior Publication Data
US 2021/0099093 A1    Apr. 1, 2021

(30) Foreign Application Priority Data
Sep. 27, 2019 (TW) ................................ 10813517.9

(51) Int. Cl.
*H02M 3/335*    (2006.01)
*H02M 1/38*    (2007.01)
*H02M 1/08*    (2006.01)

(52) U.S. Cl.
CPC ......... *H02M 3/33523* (2013.01); *H02M 1/08* (2013.01); *H02M 1/38* (2013.01)

(58) Field of Classification Search
CPC ...... H02M 3/33523; H02M 1/08; H02M 1/38; H02M 3/33592; Y02B 70/10
See application file for complete search history.

(56) References Cited

U.S. PATENT DOCUMENTS

| | | | | | |
|---|---|---|---|---|---|
| 5,828,558 | A | * | 10/1998 | Korcharz | H02M 3/33592 363/20 |
| 6,049,471 | A | * | 4/2000 | Korcharz | H02M 3/33592 363/20 |
| 7,054,168 | B1 | * | 5/2006 | Frank | H02M 3/33576 363/127 |
| 7,400,519 | B2 | * | 7/2008 | Yoshida | H02M 3/33592 363/127 |
| 9,595,878 | B2 | * | 3/2017 | Yin | H02M 3/33592 |
| 9,722,498 | B2 | * | 8/2017 | Plesnik | H02M 3/33546 |
| 10,903,751 | B2 | * | 1/2021 | Louvel | H02M 3/33592 |
| 2006/0109693 | A1 | * | 5/2006 | Kyono | H02M 3/33592 363/21.01 |

* cited by examiner

*Primary Examiner* — Kyle J Moody
(74) *Attorney, Agent, or Firm* — McClure, Qualey & Rodack, LLP

(57) ABSTRACT

A power supply has a transformer, a rectifier switch, a secondary-side controller and two diodes. The transformer includes a primary winding, a secondary winding, and a detection winding, inductively coupling to one another. The rectifier switch is connected in series with the secondary winding between two output power lines. The secondary-side controller is electrically coupled to two ends of the detection winding, for controlling the rectifier switch in response to two terminal signals at the two ends respectively. The two diodes are back-to-back electrically connected in series between the two ends, and a joint connecting the two diodes is electrically connected to one of the two output power lines.

11 Claims, 4 Drawing Sheets

POWER SUPPLIES WITH SYNCHRONOUS RECTIFICATION

CROSS-REFERENCE TO RELATED APPLICATION

This application claims priority to and the benefit of Taiwan Application Series Number 108135179 filed on Sep. 27, 2019, which is incorporated by reference in its entirety.

BACKGROUND

The present disclosure relates generally to synchronous rectification of power supply, and, more particularly, to control methods and related apparatuses for synchronous rectification of power supply.

Power supplies are normally required to provide output power source with well-regulated voltage or current. Conversion efficiency, the ratio of output power to input power of a power supply, is usually an important factor that power supply designers concern.

A conventional flyback power supply uses a transformer to direct-current (DC) isolate a primary side from a secondary side. Switching of a power switch at the primary side causes voltage change across a primary winding of the transformer, and accordingly induces alternating-current (AC) voltage across a secondary winding of the transformer. Rectification of the AC voltage provides output voltage or current to supply power to a load at the secondary side.

The most instinctive way to rectify an AC voltage or current is employ a rectifier diode, which however consumes significant power during rectification because the necessity of forward voltage, 0.7V for example for a silicon-based PN junction diode. To reduce the power consumption of a rectifier diode and to increase power conversion, it is a common practice to replace the rectifier diode with a rectifier switch. A rectifier switch should be turned OFF to provide an open circuit between two terminals when the two terminals are negatively biased, and be turned ON to provide a short circuit between the two terminals when they are positively biased. Nevertheless, the timing of turning ON and OFF the rectifier switch is critical, because it concerns about not only conversion efficiency but also safety issues of a power supply. People skilled in the art always look for better ways or methods to precisely control the rectifier switch.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
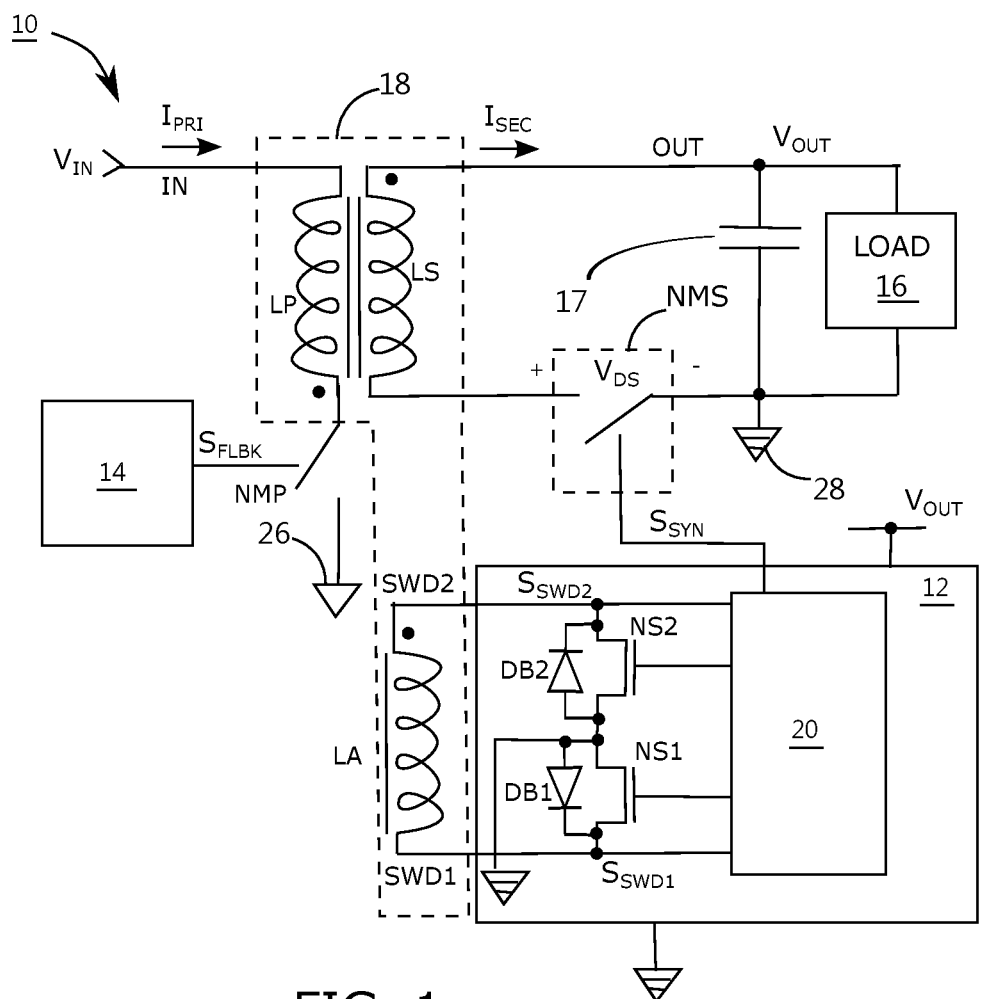
FIG. 1 shows flyback power supply 10 with the function of synchronous rectification.

According to embodiments of the invention, FIG. 1 shows flyback power supply 10 with the function of synchronous rectification, including transformer 18, primary-side controller 14, secondary-side controller 12, power switch NMP, rectifier switch NMS, and output capacitor 17.

Transformer 18 has, but is not limited to have only, primary winding LP, secondary winding LS and detection winding LA, inductively coupling to one another, where primary winding LP is at the primary side, and secondary winding LS and detection winding LA are at the secondary side. Transformer 18 might have more windings at the primary side or the secondary side. Primary winding LP is connected in series with power switch NMP between input power line IN and input power ground 26. Primary-side controller 14 generates PWM signal $S_{FLBK}$ to control power switch NMP, which turns ON and OFF to alter winding current $I_{PRI}$ so as to energize and de-energize transformer 18.

Rectifier switch NMS and secondary winding LS, at the secondary side, are connected in series between output power line OUT and output power ground 28. Control signal $S_{SYN}$ provided from secondary-side controller 12 controls rectifier switch NMS, in the hope of turning ON rectifier switch NMS to provide a low-resistance current path for charging output capacitor 17 when transformer 18 de-energizes or winding current $I_{SEC}$ is positive. In other words, rectifier switch NMS should turn ON when drain-to-source voltage $V_{DS}$ of rectifier switch NMS is negative. In the opposite, it is expected that rectifier switch NMS turns OFF when drain-to-source voltage $V_{DS}$ is positive.

Output voltage $V_{OUT}$ at output power line OUT supplies electric power to load 16, which is a rechargeable battery for example.

Secondary-side controller 12, in form of a monocrystal chip for example, has two switches NS1 and NS2, and synchronous rectifier (SR) controller 20. Switches NS1 and NS2 are connected in series between ends SWD1 and SWD2 of detection winding LA. As shown in FIG. 1, body diodes DB1 and DB2 parasitic in switches NS1 and NS2 are back-to-back connected in series between ends SWD1 and SWD2, and the joint between body diodes DB1 and DB2 is electrically connected to output power ground 28. At ends SWD1 and SWD2 are terminal signals $S_{SWD1}$ and $S_{SWD2}$ respectively.

According to embodiments of the invention, SR controller 20 generates control signal $S_{SYN}$ in response to terminal signals $S_{SWD1}$ and $S_{SWD2}$, to control rectifier switch NMS. In other words, SR controller 20 determines the timing of turning ON and OFF rectifier switch NMS, based on terminal signals $S_{SWD1}$ and $S_{SWD2}$.

Figure 2:
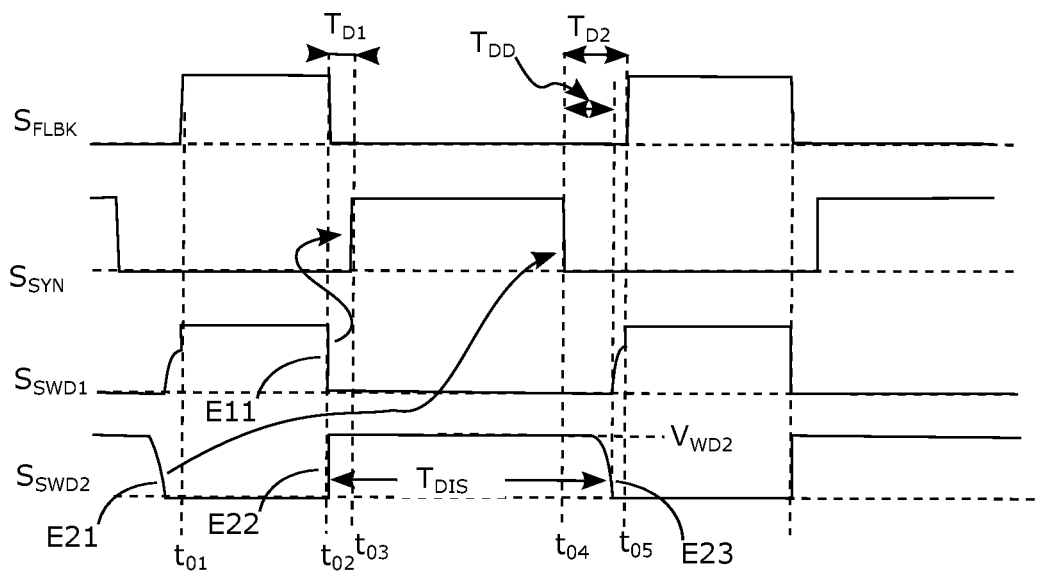
FIG. 2 shows waveforms of some signals in FIG. 1.

FIG. 2 shows waveforms of some signals in FIG. 1. PWM signal $S_{FLBK}$ has a rising edge at moment $t_{01}$, starting both the ON time of power switch NMP and a new switching cycle. When power switch NMP is turned ON, control signal $S_{SYN}$ remains "0" in logic to turn OFF rectifier switch NMS, terminal signal $S_{SWD1}$ has a positive voltage reflecting input voltage $V_{IN}$ at input power line IN, and terminal signal $S_{SWD2}$ is about 0V, the voltage of output power ground 28.

At moment $t_{02}$, PWM signal $S_{FLBK}$ turns into "0" in logic, turning OFF power switch NMP, so transformer 18 starts de-energizing. Therefore, at about moment $t_{02}$, terminal signal $S_{SWD1}$ inductively has a falling edge E11, and terminal signal $S_{SWD2}$ a rising edge E22. During the period of time when transformer 18 de-energizes, terminal signal $S_{SWD2}$ has a positive voltage reflecting output voltage $V_{OUT}$ at output power line OUT, and terminal signal $S_{SWD1}$ is about 0V, the voltage of output power ground 28.

In response to the falling edge E11, SR controller 20 starts turning ON rectifier switch NMS at moment $t_{03}$, a deadtime $T_{D1}$ later after moment $t_{02}$, as shown by control signal $S_{SYN}$ in FIG. 2. According to other embodiments of the invention, SR controller 20 turns ON rectifier switch NMS at moment $t_{03}$ in response to rising edge E22.

The length of duration when rectifier switch NMS is turned ON depends on the duration of discharge time $T_{DIS}$ when terminal signal $S_{SWD2}$ is positive in the previous switching cycle. In other words, the falling edge E21 of terminal $S_{SWD2}$ concludes discharge time $T_{DIS}$ in the previous switching cycle, and based on discharge time $T_{DIS}$ of the previous switching cycle SR controller 20 determines to turn OFF rectifier switch NMS at moment $t_{04}$ in the current switching cycle. It will be detailed later on how SR controller 20 determines the timing of turning OFF rectifier switch NMS.

At moment $t_{05}$, deadtime $T_{D2}$ later after moment $t_{04}$, PWM signal $S_{FLBK}$ has another rising edge, meaning the end of the present switching cycle and the beginning of a next switching cycle.

As shown in FIG. 2, deadtime $T_{D2}$ is from moment $t_{04}$ to moment $t_{05}$, and a portion of deadtime $T_{D2}$ is denoted as deadtime $T_{DD}$ referring to the period of time from moment $t_{04}$ to the falling edge E23 of terminal $S_{SWD2}$, the end of discharge time $T_{DIS}$ of the present switching cycle.

In one embodiment of the invention, SR controller 20 controls the duration of deadtime $T_{DD}$ based on a record created in response to the falling edge E21 of terminal signal $S_{SWD2}$ in the previous switching cycle, in order to make the duration of deadtime $T_{DD}$ approach, switching cycle by switching cycle, to a predetermined length TEXP, which is determined in association with output voltage $V_{OUT}$. As deadtime $T_{D2}$ is always longer than deadtime $T_{DD}$, SR controller 20 controlling deadtime $T_{DD}$ equivalently determines the minimum of deadtime $T_{D2}$. Deadtime $T_{DD}$ or deadtime $T_{D2}$ is adjusted based on the falling edge E21 of terminal signal $S_{SWD2}$.

Figure 3:
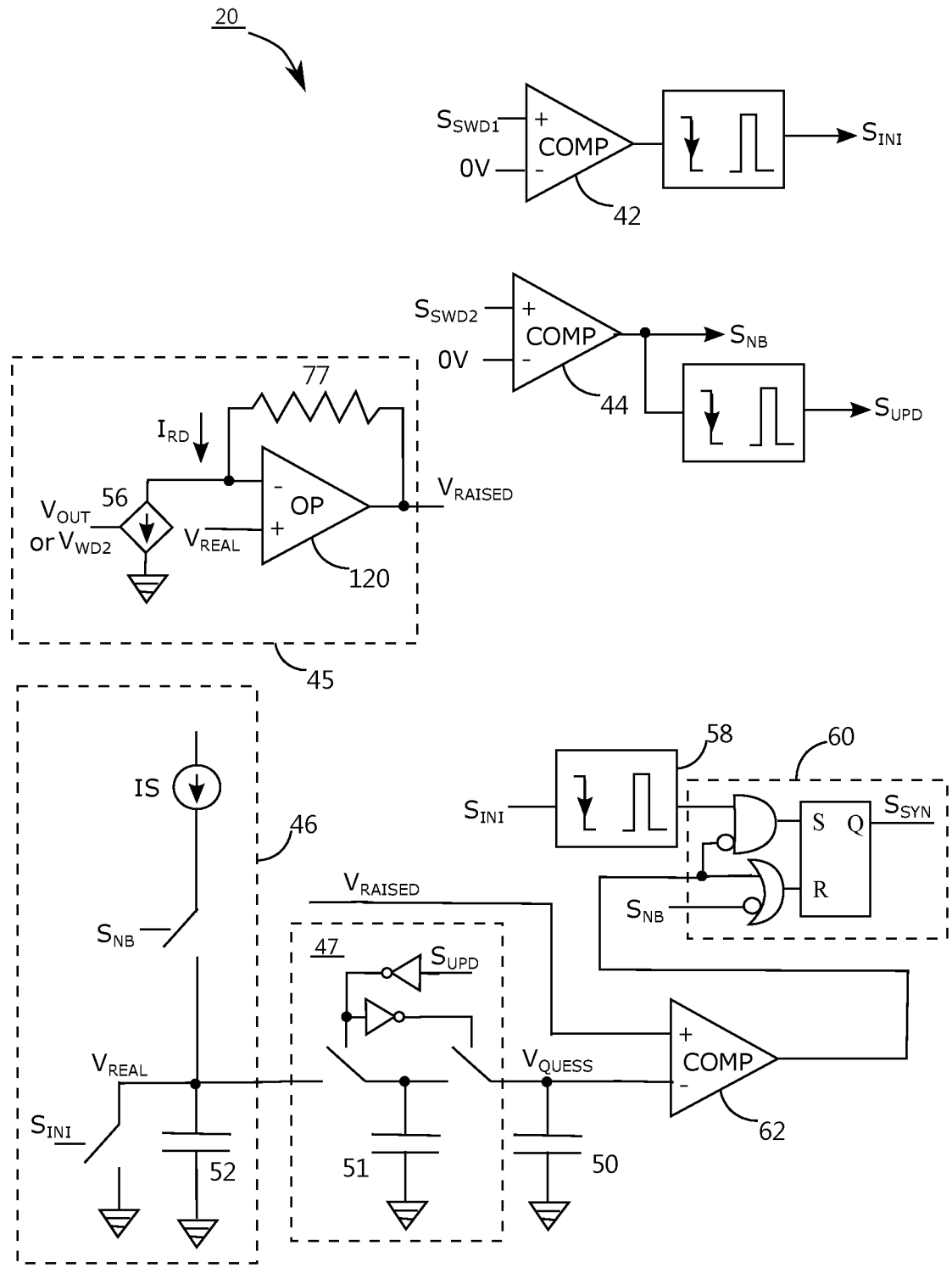
FIG. 3 demonstrates SR controller 20 in FIG. 1.

FIG. 3 demonstrates SR controller 20 in FIG. 1, which is not limited to include comparators 42 and 44, timer 46, update apparatus 47, record capacitor 50, and adder 45. Please also refer to FIG. 4, which shows signal waveforms in FIG. 3.

SR controller 20 in FIG. 3 has parts similar with or the same with parts shown in Taiwan Patent Number 1555320, which discloses a synchronous rectifier controller adaptively adjusting the ON time of a rectifier switch. In view of brevity, those similar or common parts are not detailed here in this specification.

Figure 4:
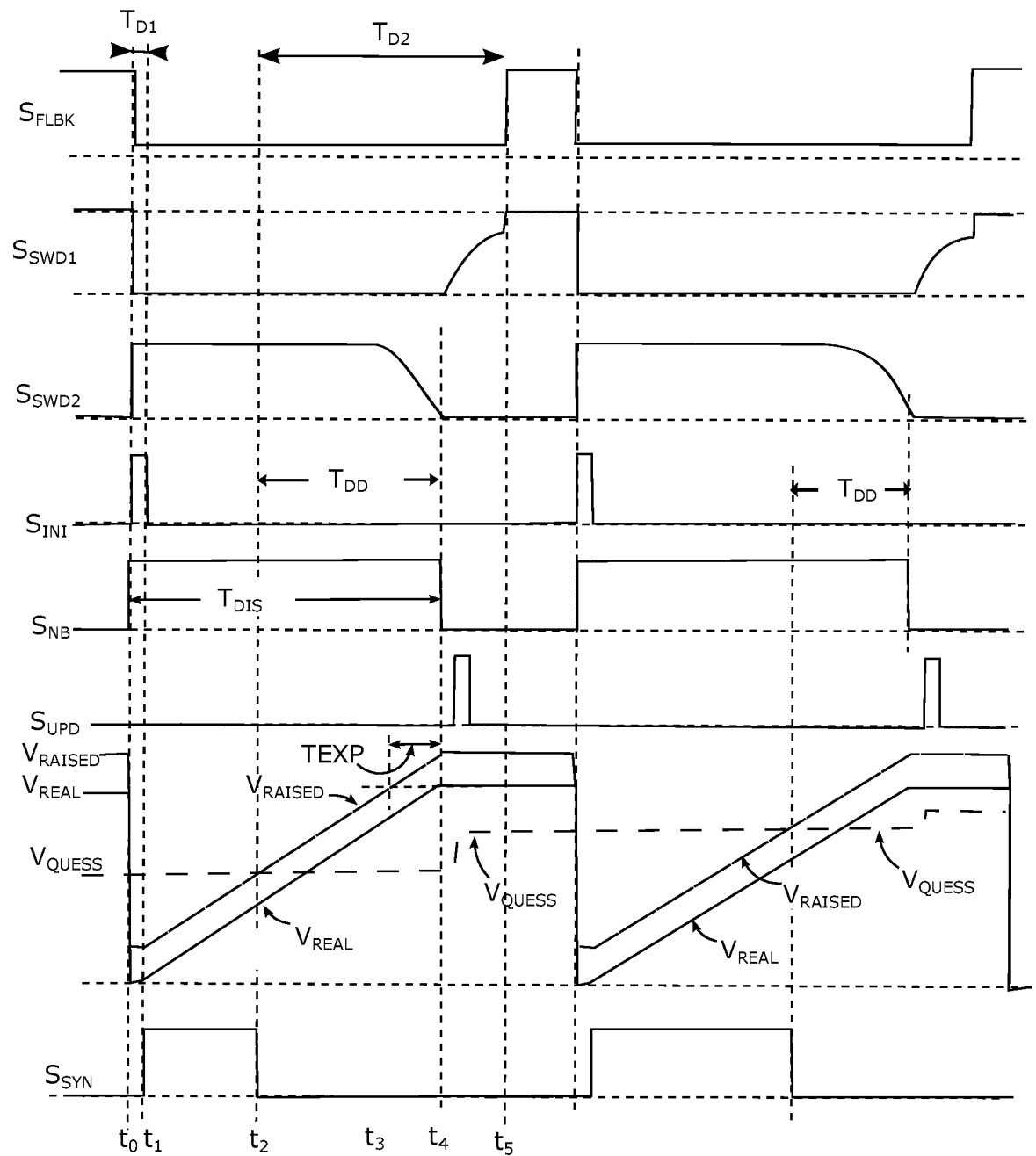
FIG. 4 shows signal waveforms in FIG. 3.

Comparator 42 senses at moment $t_0$ in FIG. 4 a falling edge of terminal signal $S_{SWD1}$, and accordingly, via signal $S_{INI}$, pulse generator 58, logic 60, and control signal $S_{SYN}$, makes rectifier switch NMS turned ON at moment $t_1$, deadtime $T_{D1}$ later after moment $t_0$.

Comparator 44 checks whether terminal signal $S_{SWD2}$ is positive, to provide signal $S_{NB}$. The duration when signal $S_{NB}$ is positive or when signal $S_{NB}$ is "1" in logic is referred to as discharge time $T_{DIS}$. At the end of discharge time $T_{DIS}$, signal $S_{NB}$ turns into "0" in logic and pulse $S_{UPD}$ is accordingly generated, as shown in FIG. 4.

Timer 46 employs current source IS and capacitor 52 to generate triangular-wave signal $V_{REAL}$, counting the duration of discharge time $T_{DIS}$ of the present switching cycle.

When discharge time $T_{DIS}$ ends, the amplitude of triangular-wave signal $V_{REAL}$ remains unchanged and represents the duration of discharge time $T_{DIS}$. Pulse $S_{UPD}$ triggers update apparatus 47 to update estimation signal $V_{QUESS}$ using triangular-wave signal $V_{REAL}$. It is comprehensible that, as switching cycles go by, estimation signal $V_{QUESS}$ is getting closer and closer to triangular-wave signal $V_{REAL}$, and becomes a good representative of the duration of discharge time $T_{DIS}$. As shown in FIG. 4, after the occurrence of pulse $S_{UPD}$, estimation signal $V_{QUESS}$ gets closer to triangular-wave signal $V_{REAL}$.

SR controller 20 is configured to turn OFF rectifier switch NMS early before the end of discharge time $T_{DIS}$, and makes deadtime $T_{DD}$, which starts at the moment when rectifier switch NMS is turned OFF and ends at the end of discharge time $T_{DIS}$, approach predetermined length TEXP switching cycle by switching cycle.

Adder 45 has voltage-to-current converter 56, resistor and operational amplifier 120. Adder 45 adds delta dV to triangular-wave signal $V_{REAL}$ to provide voltage $V_{RAISED}$. According to an embodiment of the invention, voltage-to-current converter 56 provides current $I_{RD}$ based on output voltage $V_{OUT}$. For example, $I_{RD}=K*V_{OUT}$, where K is a constant. Voltage-to-current converter 56 in an embodiment of the invention timely samples terminal signal $S_{SWD2}$ to generate voltage $V_{WD2}$, which could be a representative of output voltage $V_{OUT}$ and is used to provide current $I_{RD}$. It can be derived from adder 45 in FIG. 3 that $V_{RAISED}=V_{REAL}+dV=V_{REAL}+I_{RD}*R_{77}=V_{REAL}+K*V_{OUT}*R_{77}$, where $R_{77}$ is the resistance of resistor 77. Accordingly, delta dV is equal to $K*V_{OUT}*R_{77}$.

Comparator 62 and logic 60 in combination seem like a switch controller, which turns OFF rectifier switch NMS at the time when voltage $V_{RAISED}$ exceeds estimation signal $V_{QUESS}$. In a steady state that load 16 in FIG. 1 is about a constant, estimation signal $V_{QUESS}$ eventually represents the length of the duration of discharge time $T_{DIS}$ while voltage $V_{RAISED}$ is always delta dV higher than triangular-wave signal $V_{REAL}$. SR controller 20 in FIG. 3 is configured to have triangular-wave signal $V_{REAL}$ raise delta dV further before the end of discharge time $T_{DIS}$ after rectifier switch NMS is turned OFF, and it takes predetermined length TEXP for triangular-wave signal $V_{REAL}$ to raise delta dV further. Therefore, $TEXP=dV*C_{52}/I_{IS}$, where $C_{52}$ is the capacitance of capacitor 52 in timer 46 of FIG. 3, and $I_{IS}$ is the current magnitude of current source IS. Based on the aforementioned teaching, it can be derived that $TEXP=V_{OUT}*R_{77}*C_{52}/I_{IS}$. In other words, as switching cycles go by, estimation signal $V_{QUESS}$ more represents the real length of the duration of discharge time $T_{DIS}$, and deadtime $T_{DD}$ gets closer to predetermined length TEXP, as shown in FIG. 4. SR controller 20 determines predetermined length TEXP based on output voltage $V_{OUT}$, and the higher output voltage $V_{OUT}$ the longer predetermined length TEXP. According to another embodiment of the invention, SR controller 20 determines predetermined length TEXP based on voltage $V_{WD2}$, which is a sample from terminal signal $S_{SWD2}$ and also a representative of output voltage $V_{OUT}$.

It is beneficial to control rectifier switch NMS by detecting terminal signals $S_{SWD1}$ and $S_{SWD2}$ at two ends of detection winding LA. For instance, secondary-side controller 12 could be produced and manufactured by a low-voltage, low-cost semiconductor process flow, because secondary-side controller 12 does not directly contact with secondary winding LS, whose two ends normally have very high voltage spikes that would damage an integrated circuit seriously if the integrated circuit cannot tolerate high-voltage spikes. In view of secondary-side controller 12, even if the rating of output voltage $V_{OUT}$ varies widely from 3V to 21V, the turns ratio of transformer could be optimistically selected to keep the maximum voltages of terminal signals $S_{SWD1}$ and $S_{SWD2}$ low enough so that secondary-side controller 12, if manufactured by a low-voltage, low-cost semiconductor process flow, can sustain.

According to embodiments of the invention, SR controller 20 timely turns ON both switches NS1 and NS2 to electrically short circuit ends SWD1 and SWD2 to each other. When ends SWD1 and SWD2 have a short circuit between them, primary-side controller 14 is configured to constantly turn OFF power switch NMP, postponing the beginning of the next switching cycle. When end SWD1 is disconnected from end SWD2 by turning OFF anyone of switches NS1 and NS2, primary-side controller 14 in response sends at PWM signal $S_{FLBK}$ a pulse with a constant pulse width to briefly turn ON power switch NMP and to start a new switching cycle. Accordingly, SR controller 20 initiates the beginning of a new switching cycle by controlling switches NS1 and NS2.

Figure 5:
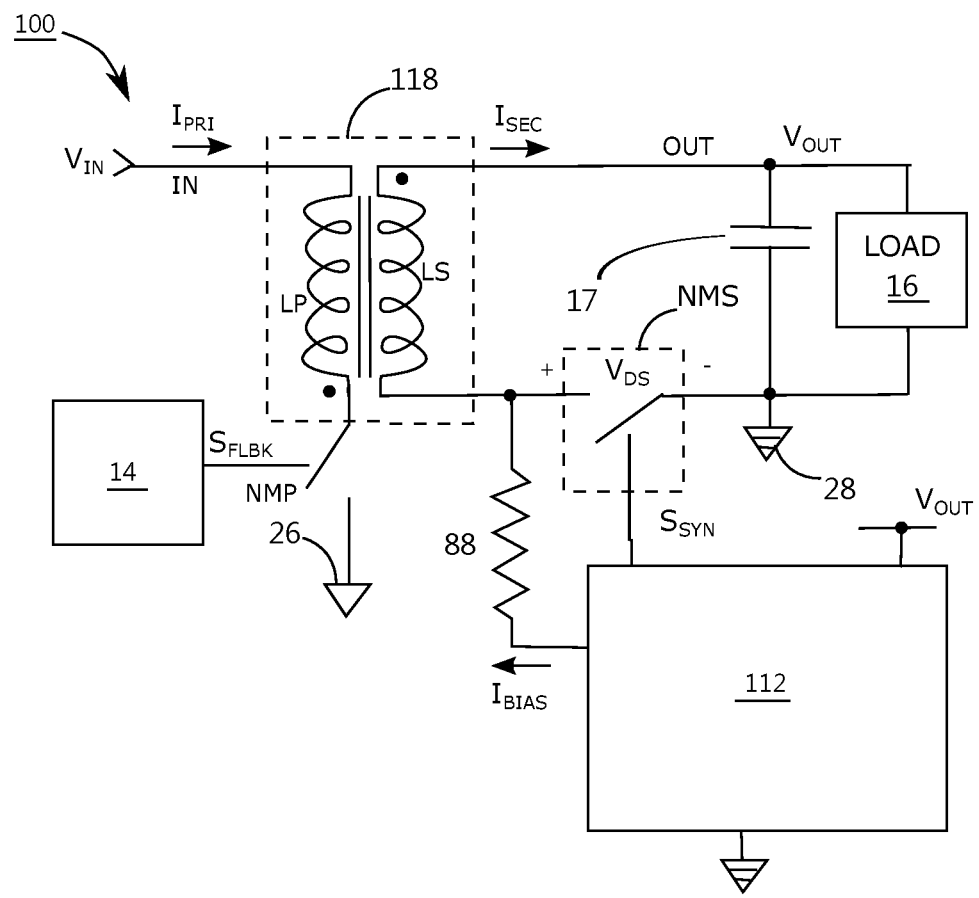
FIG. 5 demonstrates flyback power supply 100 with synchronous rectification.

Even though SR controller 20 employs terminal signals $S_{SWD1}$ and $S_{SWD2}$ to control rectifier switch NMS, but this invention is not limited to however. FIG. 5 demonstrates flyback power supply 100 with synchronous rectification, some aspects of which are not detailed herein in light of brevity for they are the same or similar with some aspects of power supply 10 in FIG. 1.

Power supply 100 has SR controller 112 detecting drain-to-source voltage $V_{DS}$ via resistor 88. SR controller 112 is configured to turn ON rectifier switch NMS when channel voltage $V_{DS}$ is found to be negative. To prevent short through, which happens when drain-to-source voltage $V_{DS}$ is positive and a large amount of current goes through a turned-ON rectifier switch NMS, deadtime $T_{D1}$ is inserted after the turning-OFF of power switch NMP and before the turning-ON of rectifier switch NMS, deadtime $T_{D2}$ is after the turning-OFF of rectifier switch NMS and before the turning-ON of power switch NMP. A deadtime refers to a period of time when both power switch NMP and rectifier switch NMS are turned OFF. If rectifier switch NMS is turned OFF too late, power conversion efficiency will suffer. It is possible to prevent rectifier switch NMS from being turned OFF too late. For example, SR controller 112 detects output voltage $V_{OUT}$, based on which bias current $I_{BIAS}$ flowing out of SR controller 112 through resistor 88 is provided when rectifier switch NMS is turned ON. The higher output voltage $V_{OUT}$, the larger bias current $I_{BIAS}$, the earlier moment when rectifier switch NMS is being turned OFF, so as to adjust the length of deadtime $T_{D2}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply, comprising:
   a transformer with a primary winding, a secondary winding, and a detection winding, inductively coupled to one another;
   a rectifier switch connected in series with the secondary winding between two output power lines;
   a secondary-side controller electrically coupled to two ends of the detection winding, for controlling the rectifier switch in response to two terminal signals at the two ends respectively;
   two diodes, back-to-back electrically connected in series between the two ends, wherein a joint connecting the two diodes is electrically connected to one of the two output power lines; and
   a power switch electrically connected in series with the primary winding;
   wherein the two terminal signals are first and second signals, a deadtime starts when the rectifier switch is turned OFF and ends when the power switch is turned ON, and the secondary-side controller is configured to adjust a minimum of the deadtime based on a falling edge of the second signal.

2. The power supply as claimed in claim 1, wherein the two terminal signals are first and second signals, and the secondary-side controller turns ON the rectifier switch in response to a falling edge of the first signal or a rising edge of the second signal.

3. The power supply as claimed in claim 1, wherein the secondary-side controller makes a duration of the minimum approach a predetermined length switch cycle by switch cycle.

4. The power supply as claimed in claim 3, wherein the secondary-side controller determines the predetermined length based on an output voltage at one of the output power lines, or a sample result generated by sampling one of the two terminal signals.

5. The power supply as claimed in claim 1, further comprising:
   two switches electrically connected in series between the two ends;
   wherein the secondary-side controller is capable of turning ON the two switches to provide a short-circuit connecting the two ends.

6. A power supply, comprising:
   a transformer with a primary winding, and a secondary winding, inductively coupled to each other;
   a power switch connected in series with the primary winding;
   a rectifier switch connected in series with the secondary winding between two output power lines; and
   a secondary-side controller controlling the rectifier switch;
   wherein the secondary-side controller adjusts a deadtime after a first moment when the rectifier switch is turned OFF and before a second moment when the power switch is turned ON, in response to an output voltage at one of the output power lines.

7. The power supply as claimed in claim 6, wherein the secondary-side controller makes a duration of the deadtime approach a predetermined length switch cycle by switch cycle, and the secondary-side controller determines the predetermined length based on the output voltage.

8. The power supply as claimed in claim 7, wherein the transformer further comprises a detection winding inductively coupled to both the primary winding and the secondary winding, and the secondary-side controller detects the output voltage via the detection winding.

9. The power supply as claimed in claim 8, wherein the secondary-side controller receives two terminal signals at two ends of the detection winding respectively to control the rectifier switch, and the power supply further comprises two diodes back-to-back electrically connected in series between the two ends.

10. The power supply as claimed in claim 9, wherein the two terminal signals are first and second signals, and the secondary-side controller turns ON the rectifier switch in response to a falling edge of the first signal or a rising edge of the second signal.

11. The power supply as claimed in claim 6, wherein the secondary-side controller is electrically connected to the secondary winding via a resistor, and provides a bias current flowing through the resistor based on the output voltage, so as to adjust the deadtime in response to the output voltage.

* * * * *